(12) United States Patent
Zhang et al.

(10) Patent No.: US 7,826,237 B2
(45) Date of Patent: Nov. 2, 2010

(54) METHOD AND SYSTEM FOR EFFICIENT POWER CONTROL WITH MULTIPLE MODES

(75) Inventors: Xiuhong Zhang, Shanghai (CN); Zhen Zhu, Shanghai (CN); Yaming Cao, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 80 days.

(21) Appl. No.: 12/123,289

(22) Filed: May 19, 2008

(65) Prior Publication Data

US 2009/0206814 A1     Aug. 20, 2009

(30) Foreign Application Priority Data

Feb. 18, 2008    (CN) .................... 2008 1 0033749

(51) Int. Cl.
*H02M 3/335*    (2006.01)
(52) U.S. Cl. .................... 363/21.12; 363/21.13
(58) Field of Classification Search ......... 323/282–285, 323/351
See application file for complete search history.

(56) References Cited

U.S. PATENT DOCUMENTS

| | | | | |
|---|---|---|---|---|
| 5,568,044 A | * | 10/1996 | Bittner | 323/272 |
| 5,729,448 A | * | 3/1998 | Haynie et al. | 363/97 |
| 6,556,478 B2 | * | 4/2003 | Willis et al. | 365/185.09 |
| 6,713,995 B2 | * | 3/2004 | Chen | 323/284 |
| 6,798,086 B2 | * | 9/2004 | Utsunomiya | 307/154 |
| 6,954,056 B2 | * | 10/2005 | Hoshino et al. | 323/285 |
| 6,972,548 B2 | * | 12/2005 | Tzeng et al. | 323/282 |
| 7,262,587 B2 | * | 8/2007 | Takimoto et al. | 323/282 |
| 7,265,999 B2 | * | 9/2007 | Murata et al. | 363/16 |
| 7,456,623 B2 | * | 11/2008 | Hasegawa et al. | 323/285 |
| 7,522,431 B2 | * | 4/2009 | Huynh et al. | 363/21.12 |
| 2005/0116697 A1 | * | 6/2005 | Matsuo et al. | 323/282 |
| 2006/0273772 A1 | * | 12/2006 | Groom | 323/284 |

* cited by examiner

*Primary Examiner*—Adolf Berhane
*Assistant Examiner*—Emily Pham
(74) *Attorney, Agent, or Firm*—Jones Day

(57) ABSTRACT

Method and system for efficient power control with multiple modes. According to an embodiment, the present invention provides a power system with selectable power modes. The power system includes a first terminal for outputting energy, and the first terminal is electrically coupled to a load. The system also includes a pulse-frequency modulation (PFM) component that is configured to adjust a pulse frequency based on the load. The system additionally includes a pulse-width modulation (PWM) component that is configured to adjust a pulse width based on the load. The system further includes a switch that is electrically coupled to the first terminal. Also, the system includes a control component, the control component being configured to provide a control signal that is capable of causing the switch to be turned on or off. The control signal is associated with an output of the PWM component and the pulse width if an output is greater than a predetermined value. The control signal is associated with an output of the PFM component and the pulse frequency if an output is lower than a predetermined value.

9 Claims, 10 Drawing Sheets

(a)

(b)

METHOD AND SYSTEM FOR EFFICIENT POWER CONTROL WITH MULTIPLE MODES

CROSS-REFERENCES TO RELATED APPLICATIONS

This application claims priority to Chinese Patent Application No. 200810033749.0, filed Feb. 18, 2008, entitled "Method and System for Efficient Power Control with Multiple Modes," by inventors Xiuhong Zhang, Zhen Zhu, Yaming Cao, and Lieyi Fang, commonly assigned, incorporated by reference herein for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is related to integrated circuits. More specifically, the present invention can be applied to devices used controlling power supply. According to various embodiments, the present invention provides various power control schemes to improve system stability and performance. Merely by way of example, the present invention can be used in a power system that is selectively operable in various power modes based on operating conditions, such as the output power level, power consumption, etc. It is to be appreciated that the present invention has a broad range of applications.

The pulse width modulation (PWM) technique is widely used in power supply systems. More specifically, the PWM technique has been adopted in many regulated switch mode power converter designs. Among other thing, a benefit of the regulated switch mode power converters is their higher efficiency comparing to linear regulator. As energy saving requirement and efficiency regulations becoming more stringent, regulated switch mode power converters are becoming increasingly more popular. In comparison, linear regulators are becoming less popular and may be out of market for its poor power efficiency and power saving capabilities. In the near future, switching power converters are likely to become the main topology for power supply system.

In the switching power conversion systems, power switches are often implemented using power MOSFET, Power bipolar transistor, IGBT or other type of transistor as the switching elements. The amount of energy transferring is regulated by power switching on and off time. For example, the on and/or off time of the PFM signals are controlled in accordance with the output load. In a specific example, the output voltage and/or current is regulated by sensing the output voltage and/or current and applying the corresponding control signals to the power switches.

FIG. 1 is a simplified diagram illustrating a conventional flyback switching power conversion system. The system 100 includes a PWM controller 101 is used to control and drive a power MOSFET 102, which turns on and off to control the power delivered to the load in the secondary side. The output voltage and current are sensed in the secondary side and compared with the desired output voltage and current reference. The error signal is amplified and feedback to the controller in primary side via a photo-coupler. Usually, a TL431 (e.g., a component for providing isolated feedback) or similar type of ICs and PC817 (e.g., a photo coupler) or similar type ICs are used in the secondary side for the isolation feedback.

FIG. 2 is a simplified diagram illustrating an alternative conventional flyback switching power conversion system. As shown in FIG. 2, a system 200 has a primary side and a secondary side. As shown, sensing, amplification, and the signal transferring (e.g., accomplished by the photo coupler in system 100) are omitted, which largely reduces the manufacturing costs of the system 200. In the primary side controlled switched power conversion system, the output voltage is imaged to the auxiliary winding (AUX). As a result, the output voltage can be sensed by monitoring the voltage at auxiliary winding (AUX). In various application, the output voltage is regulated by comparing the voltage at AUX with the desired voltage reference. More specifically, the output voltage signal is mapped to the signal at node 201. The regulation of voltage at the node 201 translates into the regulation of the output voltage.

To further illustrate, the primary side regulation, the relationship of $V_{FB}$ and $V_{out}$ is expressed as:

$$V_{FB} = \frac{n \cdot R_2}{R_1 + R_2} \cdot V_{out}, \quad (1)$$

Where n is the ratio of auxiliary winding to secondary winding.

Setting $$k = \frac{R_1 + R_2}{n \cdot R_2},$$

Vout is expressed as the following:

$$V_{out} = k \cdot V_{FB} \quad (2)$$

Both the system 100 and system 200 as illustrated above are useful for certain applications. Unfortunately, these conventional system are often inadequate.

Therefore, improved systems and methods for providing power supply are desired.

BRIEF SUMMARY OF THE INVENTION

The present invention is related to integrated circuits. More specifically, the present invention can be applied to devices used controlling power supply. According to various embodiments, the present invention provides various power control schemes to improve system stability and performance. Merely by way of example, the present invention can be used in a power system that is selectively operable in various power modes based on operating conditions, such as the output power level, power consumption, etc. It is to be appreciated that the present invention has a broad range of applications.

According to various embodiments, power systems according to the present invention operate in multiple power modes. For example, when the output voltage is lower than a threshold voltage level, the power system operates in a pulse frequency modulation (PFM) mode. At the PFM mode, the peak current stays substantially the same for almost all loading conditions, and the switching frequency changes according to the output voltage. On the other hand, when the output reaches and/or passes the threshold voltage level, the power system operates in a PWM mode, where voltage regulation is accomplished by varying pulse width.

According to an embodiment, the present invention provides a power system with selectable power modes. The power system includes a first terminal for outputting energy, and the first terminal is electrically coupled to a load. The system also includes a pulse-frequency modulation (PFM) component that is configured to adjust a pulse frequency based on the load. The system additionally includes a pulse-width modulation (PWM) component that is configured to adjust a pulse width based on the load. The system further includes a switch that is electrically coupled to the first terminal. Also, the system includes a control component, the control component being configured to provide a control signal that is capable of causing the switch to be turned on or off. The control signal is associated with an output of the PWM component and the pulse width if an output is greater than a predetermined value. The control signal is associated with an output of the PFM component and the pulse frequency if the output is lower than the predetermined value.

According to an alternative embodiment, the present invention provides a method for supplying power. The method includes receiving a power input from an input source. The method also includes delivering a power output to a load. The method additionally includes measuring a feedback voltage that is associated with an output voltage for the load. The method further includes comparing the feedback voltage to a first threshold voltage. The method also includes delivering power using a pulse-width modulation if the feedback voltage is higher than the first threshold voltage. The method also includes delivering power using a pulse-frequency modulation if the feedback voltage is lower than the first threshold voltage. In addition, the method includes terminating the power output to the load if the feedback voltage is lower than a second threshold voltage.

According to an alternative embodiment, the present invention provides an apparatus for output power using a pulse frequency modulation. The apparatus includes an input for receiving a feedback signal. The apparatus also includes a pulse generator. The pulse generate is configured to generate pulses at substantially a constant frequency. In addition, the apparatus includes an oscillator configured to provide output signals at a frequency that is associated with the feedback signal. In addition, the method includes a logic component that is configured to provide a control signal based at least on the pulses and the output signals.

Many benefits are achieved by way of the present invention over conventional techniques. In some embodiments, the method provides an energy efficient and high performance way that provides power to both light and heavy loads. By practicing embodiment of the present invention, the amounted of energy wasted during a power switching process is reduced, and the switching time is reduced as well. Additionally, the method provides a process that is compatible with conventional process technology without substantial modifications to conventional equipment and processes. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

The present invention is related to integrated circuits. More specifically, the present invention can be applied to devices used controlling power supply. According to various embodiments, the present invention provides various power control schemes to improve system stability and performance. Merely by way of example, the present invention can be used in a power system that is selectively operable in various power modes based on operating conditions, such as the output power level, power consumption, etc. It is to be appreciated that the present invention has a broad range of applications.

Figure 1:
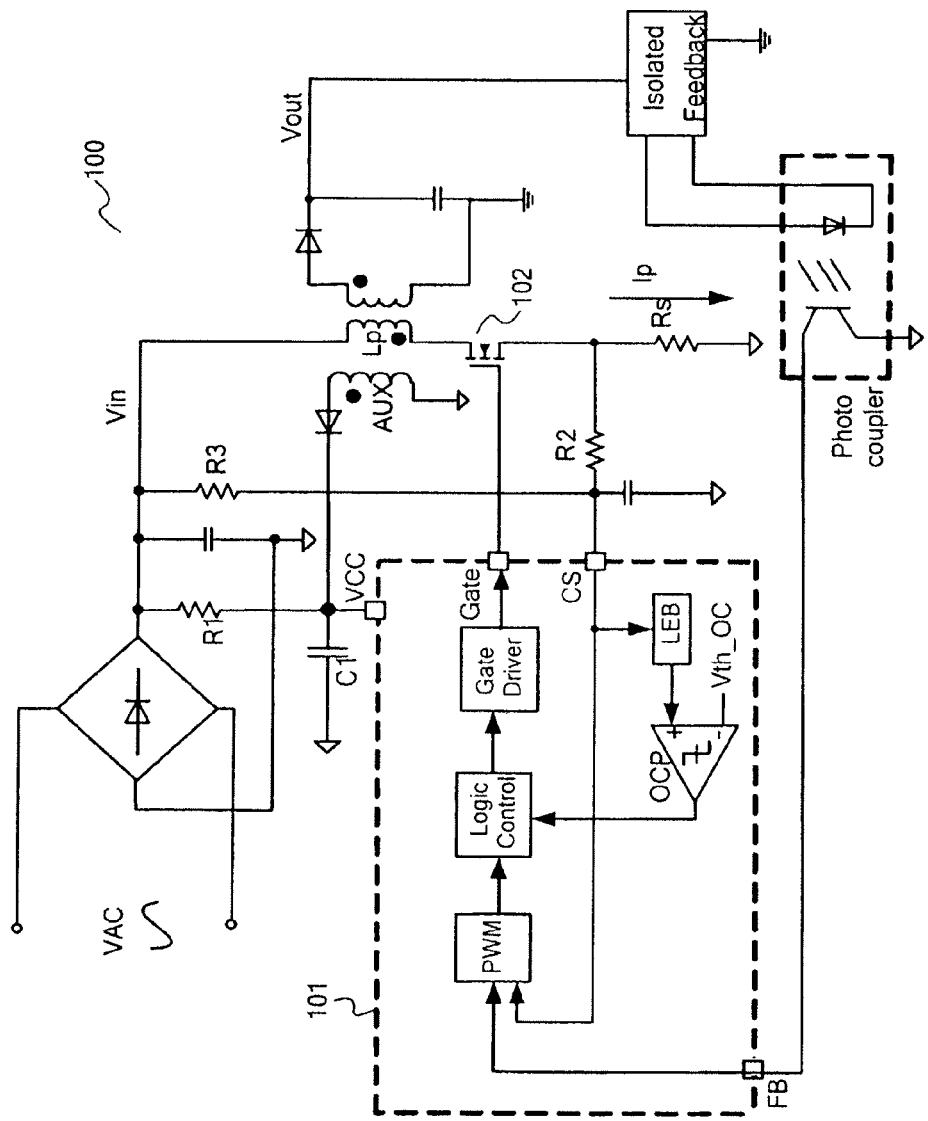
FIG. 1 is a simplified diagram illustrating a conventional flyback switching power conversion system.
Figure 2:
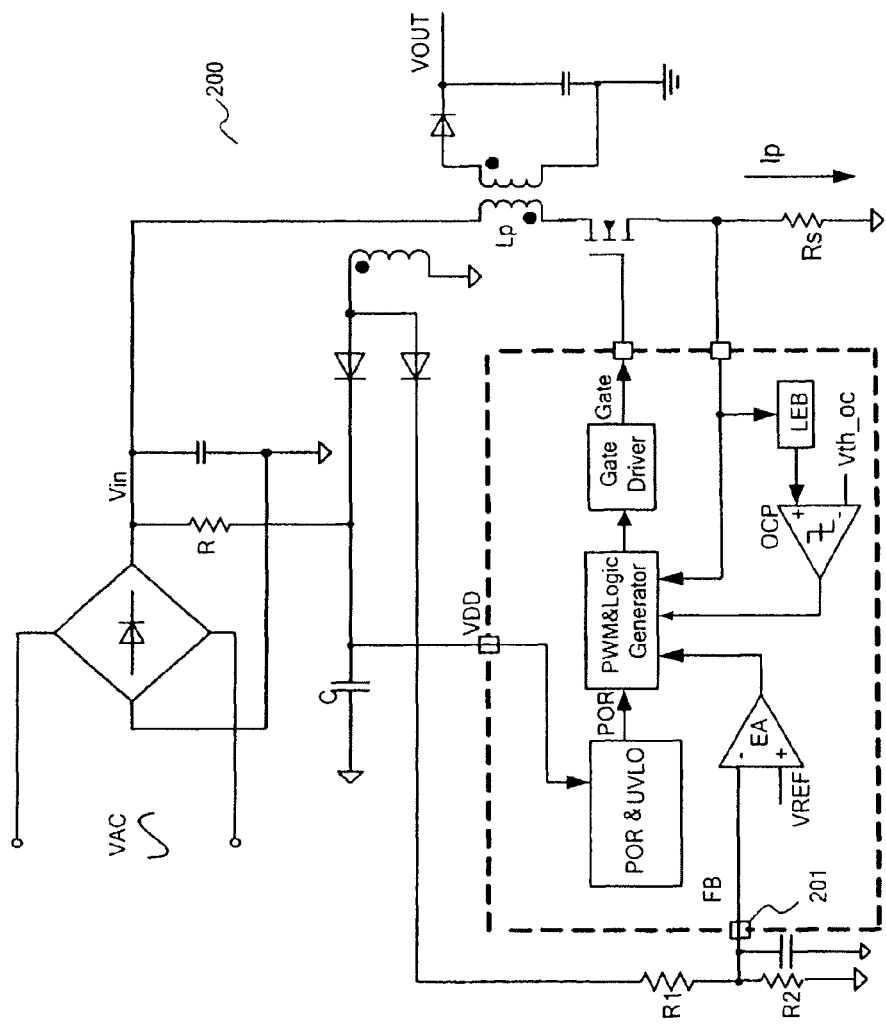
FIG. 2 is a simplified diagram illustrating an alternative conventional flyback switching power conversion system.

As described above, conventional system are often inadequate. For example, the system 100 as illustrated in FIG. 1 is often expensive to implement (e.g., due to added cost of switched power conversion system) and inefficient. In comparison, the system 200 as illustrated in FIG. 2 is relatively less expensive to implement, as various components used in the secondary side of system 100 is simplified and/or eliminated in system 200. For example, the reduced cost of manufacturing the system 200 is allows the system to be widely adopted for various applications, such as for handle equipment, cellular phones, etc.

While system 200 offers certain advantage over the system 100, it is still often inadequate for various applications. Among other things, system 200 or the like are often unable to provide constant output voltage and/or current.

Figure 3:
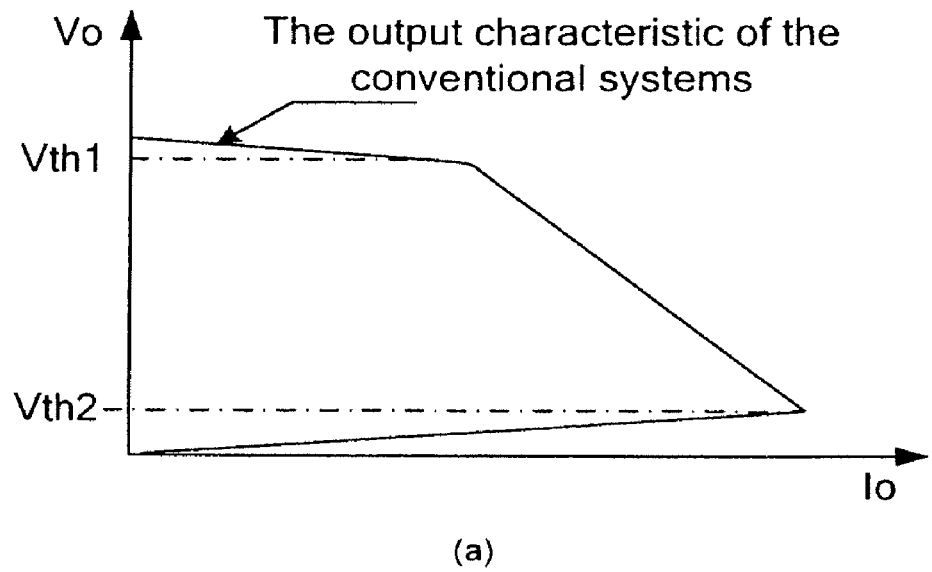
FIG. 3(a) is a simplified graph illustrating outputs of a conventional system.
FIG. 3(b) is a simplified conventional graph illustrating the output characteristic desired by some applications.
Figure 3:
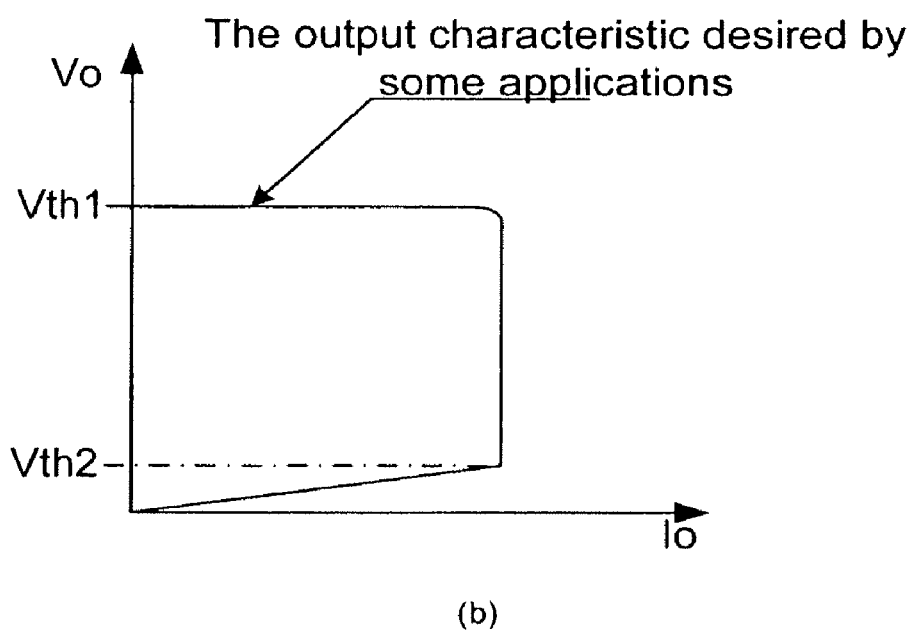

FIG. 3(a) is a simplified graph illustrating outputs of a conventional system. For example, the conventional system is or substantially similar to the system 200. As shown in FIG. 3(a), the output voltage is kept regulated as described above. However, it is difficult to keep the output current constant when the output voltage is below a threshold voltage. As a result, the output is non-linear and therefore undesirable for many applications. In contrast, FIG. 3(b) is a simplified conventional graph illustrating the output characteristic desired by some applications.

It is to be appreciated that various embodiments of the present invention provide a cost-effective solution that is capable of providing substantially linear power delivery and efficient energy consumption. For example, certain embodiments of the present invention provide a constant current over a range of voltage values, a desirable characteristic as shown in FIG. 3(b).

According to certain embodiments, the present invention provides a technique where a power system delivers energy by pulse frequency modulation, the detail of which is presented below.

For typical flyback switched power conversion systems operated in discontinues current mode (DCM), the power delivered to the secondary side output can be expressed as in the following equation:

$$\varepsilon = \frac{1}{2} \cdot L_p \cdot I_{peak}^2 = PT \quad (3)$$

The maximum power P is expressed as:

$$P = \frac{L_p \cdot I_{peak}^2}{2 \cdot T} = \frac{f}{2} \cdot L_p \cdot I_{peak}^2 = V_{out} \cdot I_{out}, \quad (4)$$

In Equation 4, f is the switching frequency. T is the switching period. Lp is the inductance of the primary winding. Ipeak is the primary winding peak current at the end of the switching on time.

In the voltage regulation (constant voltage) mode, the peak current is controlled by the feedback signal, the error of Vout to the desired voltage is amplified and that controls the PWM pulse width thus the turn on time of the switch. The output voltage is regulated through the closed feedback loop.

In a constant current mode, the output current are not sensed in the primary side (e.g., at the primary inductor of the power system) controlled converter. In various embodiment, voltage regulation is performed by other means. According to a specific embodiment, power regulation is accomplished by modulating the peak current level at different output voltage levels. For example, the power regulation is expressed as the following:

$$I_{peak} = \sqrt{2 \cdot \frac{V_{out} \cdot I_{out}}{f \cdot L_p}} \quad (5)$$

Figure 5:
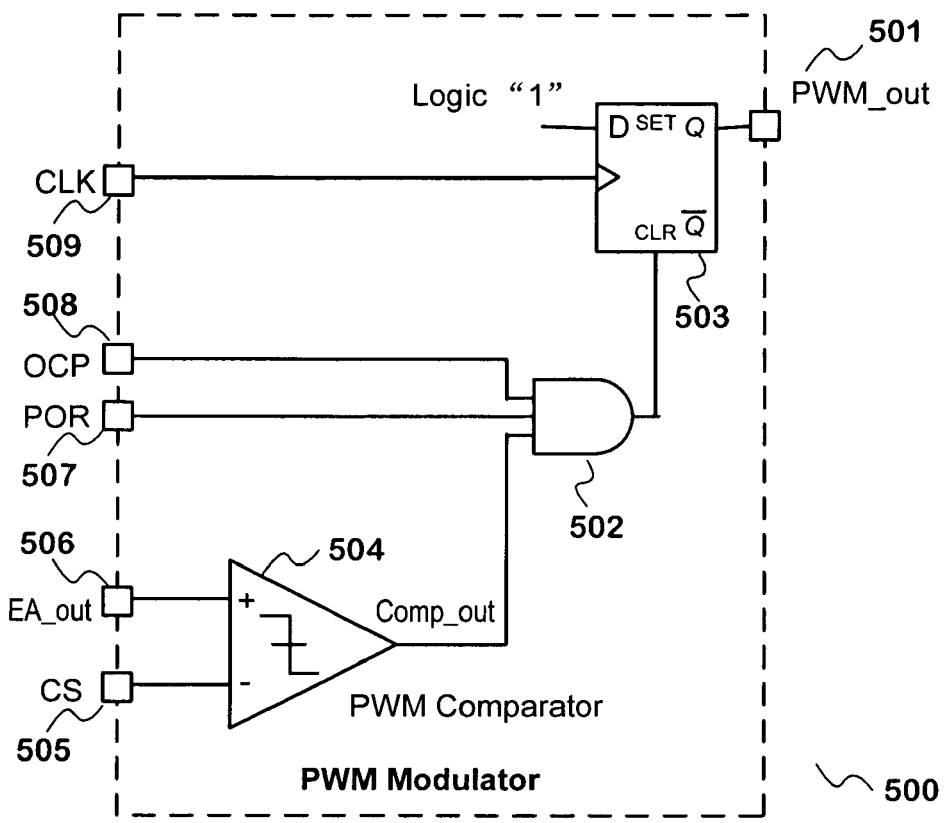
FIG. 5 is a simplified diagram illustrating a PWM component according to an embodiment of the present invention.

As shown in FIG. 5, the peak current increases when the output voltage increases, thereby maintaining the output current constant.

According to another embodiment, the power regulation is performed by modulating switching frequency. For example, the frequency modulation is expression as the following:

$$f = 2 \cdot \frac{V_{out} \cdot I_{out}}{L_p \cdot I_{peak}^2} \quad (6)$$

As shown in Equation 6, the peak current stays the same when output voltage varies. For a given output current (Iout), the switching frequency increases with the output voltage, while the output current stays constant. For example, Equation 6 illustrates a principle of operation for PFM techniques.

Usually, the power regulation according to Equation 5 is more difficult to implement compared to the power regulation method according to Equation 6. More specifically, the power regulation according to Equation 5 is nonlinear function (square root), therefore complicate to implement. In comparison, the power regulation method according to the Equation 6 is a linear function, and therefore it is relatively easy to implement. More specifically, power regulation methods according to Equation 6 are typically useful when output voltage level is lower than a certain threshold voltage.

Figure 4:
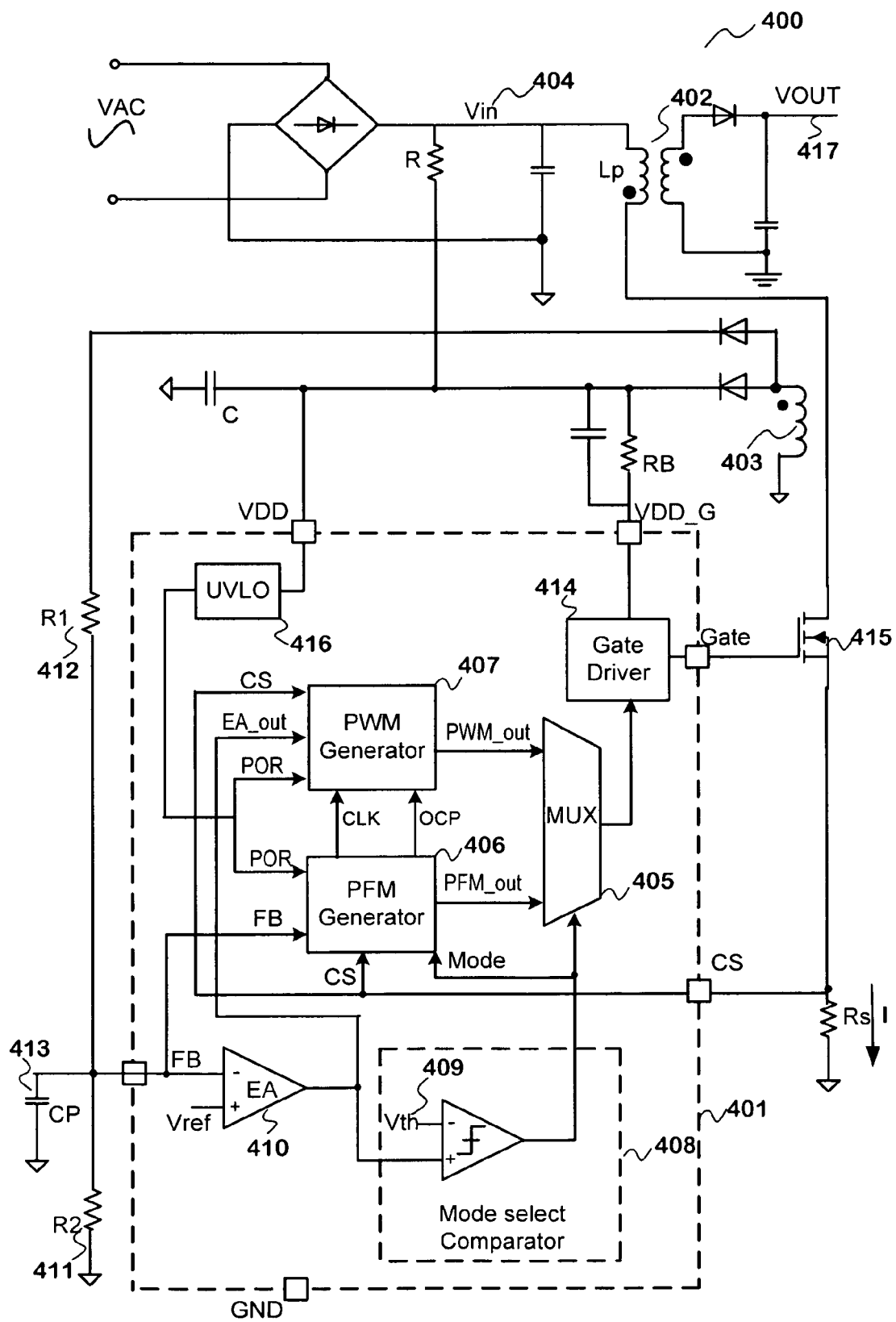
FIG. 4 is a simplified diagram illustrating an embodiment of the present invention.

FIG. 4 is a simplified diagram illustrating an embodiment of the present invention. This diagram is merely an example, which should not unduly limit the scope of the claims. One of ordinary skill in the art would recognize many variations, alternatives, and modifications.

As shown in FIG. 4, a power system 400 includes the following components:
1. primary winding 402;
2. an auxiliary winding 403;
3. an input voltage 404;
4. an MUX selector 405;
5. a PFM component 406;
6. a PWM component 407;
7. a mode selector 408;
8. a threshold voltage 409;
9. an error amplifier 410;
10. resistors 411 and 412;
11. a capacitor 413;
12. a switch 415;
13. an UVLO component 416;
14. a gate driver 414; and
15. an output 417.

During operation, the system 400 receives power from the input voltage 404. The system 400 sets the output power level based on the output load and provides the output 417. As shown in FIG. 4, the system 400 includes both the primary winding 402 and the auxiliary winding 403. The primary winding 402 is used to deliver power to the output 417. The auxiliary winding 403 is used to obtain a feedback signals for the system 400 to set the output power level. The system 400 sets the output level by operating the switch 415. For example, the switch 415 is implemented by a power MOSFET. Depending on the specific application, the switch 415 may be implemented by other types of switching components (e.g., BJT, etc.).

The system 400 sets the power level through the power control component 401. According to various embodiments, the system 400 is capable of operating in both PFM mode and PWM mode. When the system 400 operates in the PFM mode, the power control component 401 turns the switch 415 on and off at various frequencies with constant pulse width based on the output load condition. When the system 400 operates in the PWM mode, the power control component 401 turns the switch 415 at different "on" times based output the output load condition. The system 400 switches between the PFM and PWM mode based on the output load condition. For example, when the output voltage is above a threshold level, the system 400 operates at the PWM mode. On the other hand, when the output voltage is at or below the threshold level, the system 400 operates at the PFM mode. For example, the output current remains constant when operating in the PFM mode, as explained above.

The control component 401 determines the operation mode by sensing the load via the auxiliary winding 403. As shown in FIG. 4, both power delivery and feedback sensing features are implemented using inductive devices (i.e., inductors). But it is to be understood that other types of electrical devices may be used as well. The auxiliary winding 403 is coupled with second side winding. As a result, the output voltage can be approximately imaged to the auxiliary winding. In a specific embodiment, the voltage in auxiliary winding is also as the power supply for the control component 401. The voltage after rectification and attenuated is also fed into an FB pin as the control signal for the control component 401.

A feedback voltage is obtained by the auxiliary winding 403 and the capacitor 413 and the resistors 412 and 411. For example, the feedback voltage is associated with the output load condition. According to an embodiment, the feedback voltage is stabilized by the capacitor 413 and the resistors 412 and 411. For example, the capacitor 413 is used for loop stability as the voltage at FB is nearly a DC voltage which is proportional to the output voltage at output 417. As merely an example, the divided voltage between the resistors 412 and 411 is averaged by the RC filter included a resistive divider and the capacitor 413, and the divided voltage is proportional to the output voltage.

As shown, the control component 401 is configured to provide two operation modes: PFM and PWM modes. For example, when an initial output voltage is less than the predetermined voltage level, the power conversion needed to be operated in a Constant Current (CC) Mode. The attenuated feedback signal at FB is fed respectively into the error amplifier (EA) 410 and the PFM component 406. When the FB signal is lower than the reference voltage of EA, the output of EA will be pull up to high voltage level, thereby causing the mode selector to output a signal to select the PFM component 406 for power control. For example, the PFM component 406 controls the on and off of the switch 415. At the PFM mode, the feedback voltage at FB is provided to the input of EA 410. The feedback voltage gradually increases when the output voltage increase (e.g., due to an increase in load condition). When feedback voltage at the node FB is close to the reference voltage for the EA 410, the output of EA falls a level lower than the predetermined voltage, thereby causing the mode selector 408 to disable the PFM operation mode and enable the PWM operation mode. At the PWM operation mode, the PWM component 407 controls the on/off of the switch 415. In addition, when operating at the PWM mode, the system 400 is also operating according to a Constant Voltage (CV) Mode.

FIG. 5 is a simplified diagram illustrating a PWM component according to an embodiment of the present invention. This diagram is merely an example, which should not unduly limit the scope of the claims. One of ordinary skill in the art would recognize many variations, alternatives, and modifications. As shown in FIG. 5, a PWM component 506 includes the following:

1. an output 501;
2. logic components 502 and 503;
3. a PWM comparator 504; and
4. inputs 505, 506, 507, 508, and 509.

It is to be appreciated that the configuration and parts of the component 500 may be added, removed, replaced based on the specific application. As an example, the logic component 503 is a flip-flop and the logic component 502 is an AND gate. The PWM comparator 504 generates and output Comp_out based on the values at inputs 505 and 506. For example, the output of the PWM comparator 504 is based on the difference between the inputs 505 and 506, allow the PWM component 500 to adjust pulse-width based on the feedback output signal (EA_out) 506. According to an embodiment, the logic component generates the output 501 based on the input 509, which provides a clock frequency for the pulse. The output of the PWM comparator 504 and inputs 507 and 508 determine the width of each pulse. As an example, the input 507 is provided by a PFM component and the input 508 is provided by an UVLO component.

Figure 6:
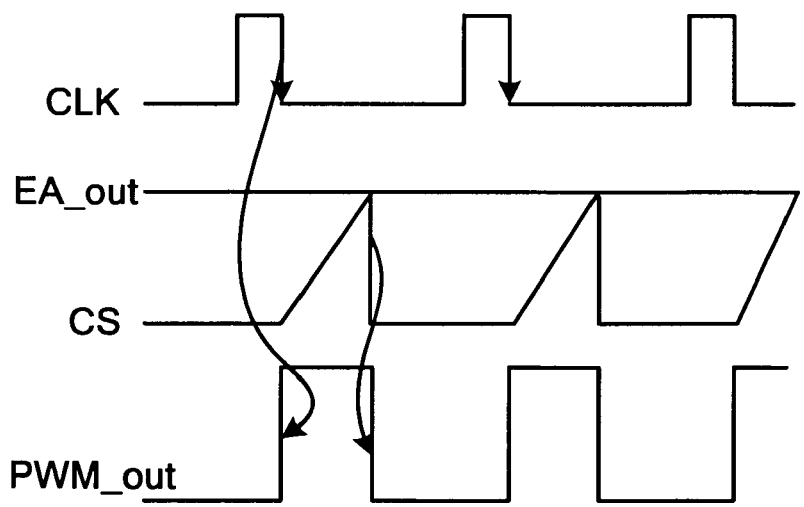
FIG. 6 is a simplified timing diagram illustrating output of a PWM component according to an embodiment of the present invention.

FIG. 6 is a simplified timing diagram illustrating output of a PWM component according to an embodiment of the present invention. This diagram is merely an example, which should not unduly limit the scope of the claims. One of ordinary skill in the art would recognize many variations, alternatives, and modifications. As shown, a PWM signals are associated with a fixed frequency, and the pulse width is based on the result of comparing the peak value of a current sensing signal to the output voltage of EA.

Figure 7:
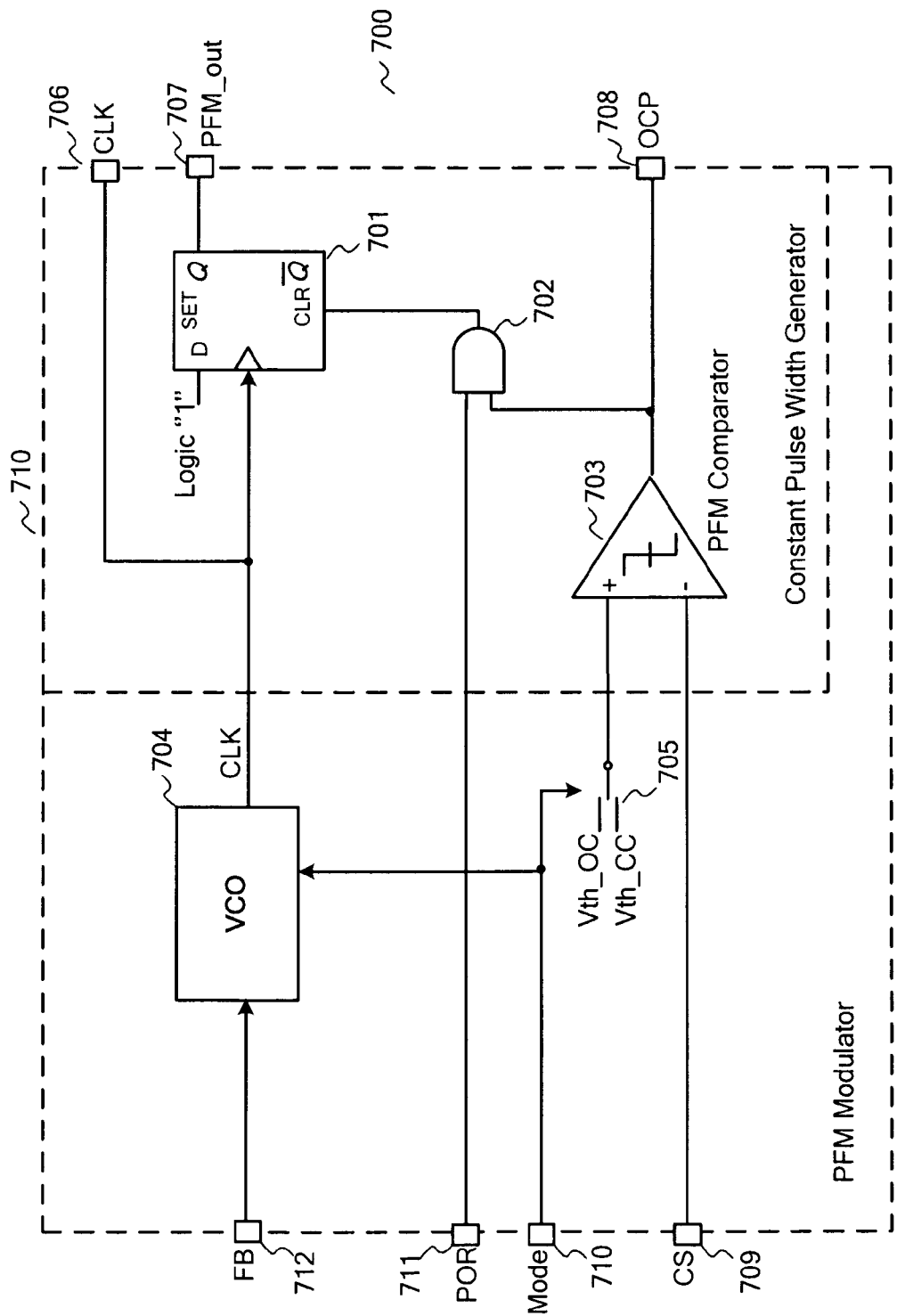
FIG. 7 is a simplified diagram illustrating a PFM modulation device according to an embodiment of the present invention.

Now referring back to FIG. 4. The PFM component 406 is implemented alongside the PWM component to provide pulse frequency modulation. FIG. 7 is a simplified diagram illustrating a PFM modulation device according to an embodiment of the present invention. This diagram is merely an example, which should not unduly limit the scope of the claims. One of ordinary skill in the art would recognize many variations, alternatives, and modifications. As shown in FIG. 7, a PFM module 700 includes a voltage controlled oscillator (VCO) 704, a selector 705, a comparator 703, a logic gate 702, and a flip-flop 701.

Components as shown within the box 710 are used to generate constant pulse width. The output of the VCO 704 is used as a clock signal for the flip-flop. For example, the VCO 704 generates a clock signal that is used to synchronize PFM signals. The VCO 704 varies clock frequency based on the feedback voltage from the input 712. When the feedback voltage is high, the clock frequency is high. On the other hand, when the feedback voltage is low, the clock frequency is low. Among other things, high feedback voltages typically indicates a high load condition. Therefore it is important to increase the frequency of pulses that deliver power to the load. On the other hand, if the feedback voltage is low, it is typically an indication that the load condition is low; thereby the frequency associated with pulses for power deliver is to be reduced. According to an embodiment, when the load condition is below an under voltage lock out threshold voltage, the PFM modulation is turned off at the PFM module 700.

Figure 8:
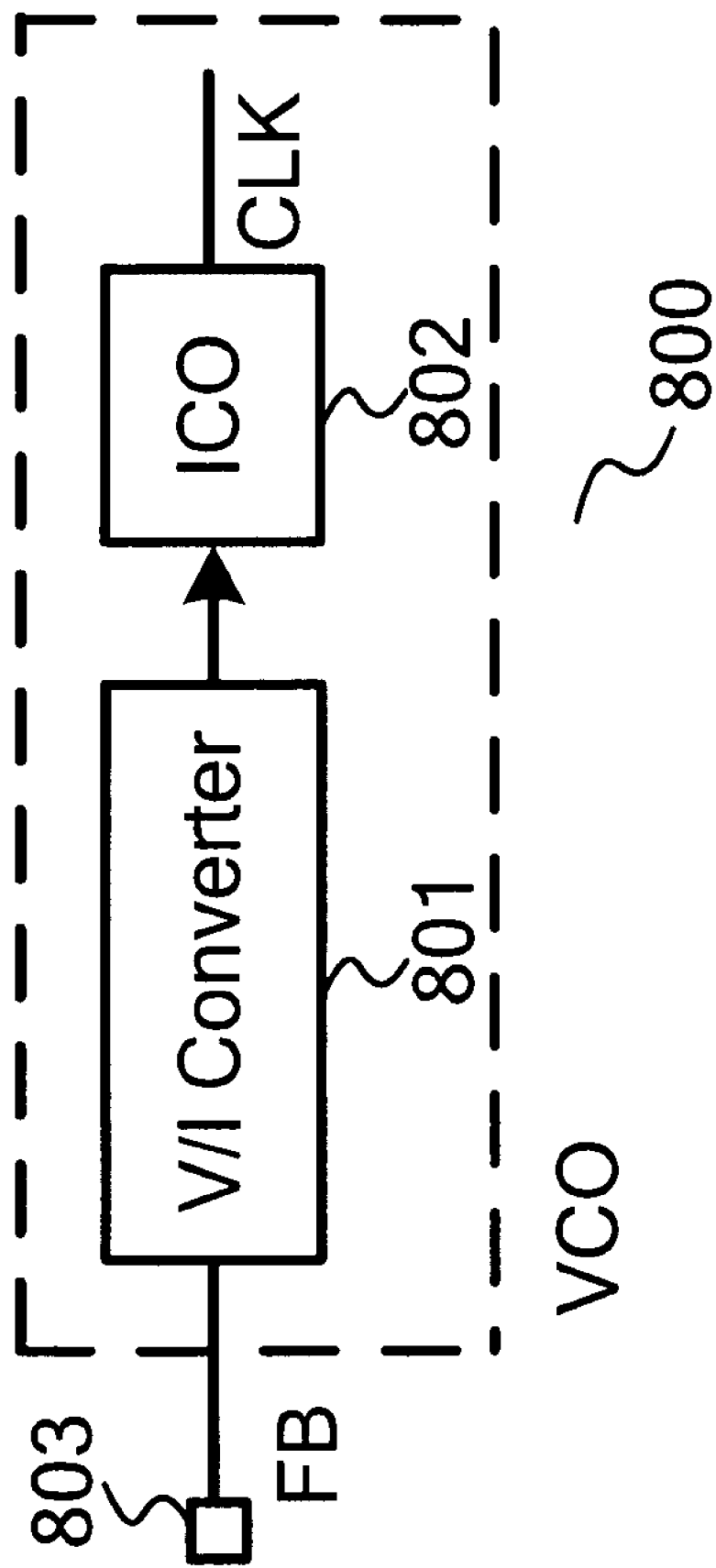
FIG. 8 is a simplified diagram illustrating a voltage controlled oscillator according to an embodiment of the present invention.

FIG. 8 is a simplified diagram illustrating a voltage controlled oscillator according to an embodiment of the present invention. This diagram is merely an example, which should not unduly limit the scope of the claims. One of ordinary skill in the art would recognize many variations, alternatives, and modifications. As shown, a VCO 800 includes a voltage to current converter 801 and a current controlled oscillator 802. The current controlled oscillator 802 generates a clock signal whose frequency has a direct relationship with the feedback voltage 803. For example, the clock frequency is high when the feedback voltage is high (i.e., high load condition). On the other hand, the clock frequency is low when the load condition is low. It is to be understood that the VCO 800 may be implemented using other components.

Figure 9:
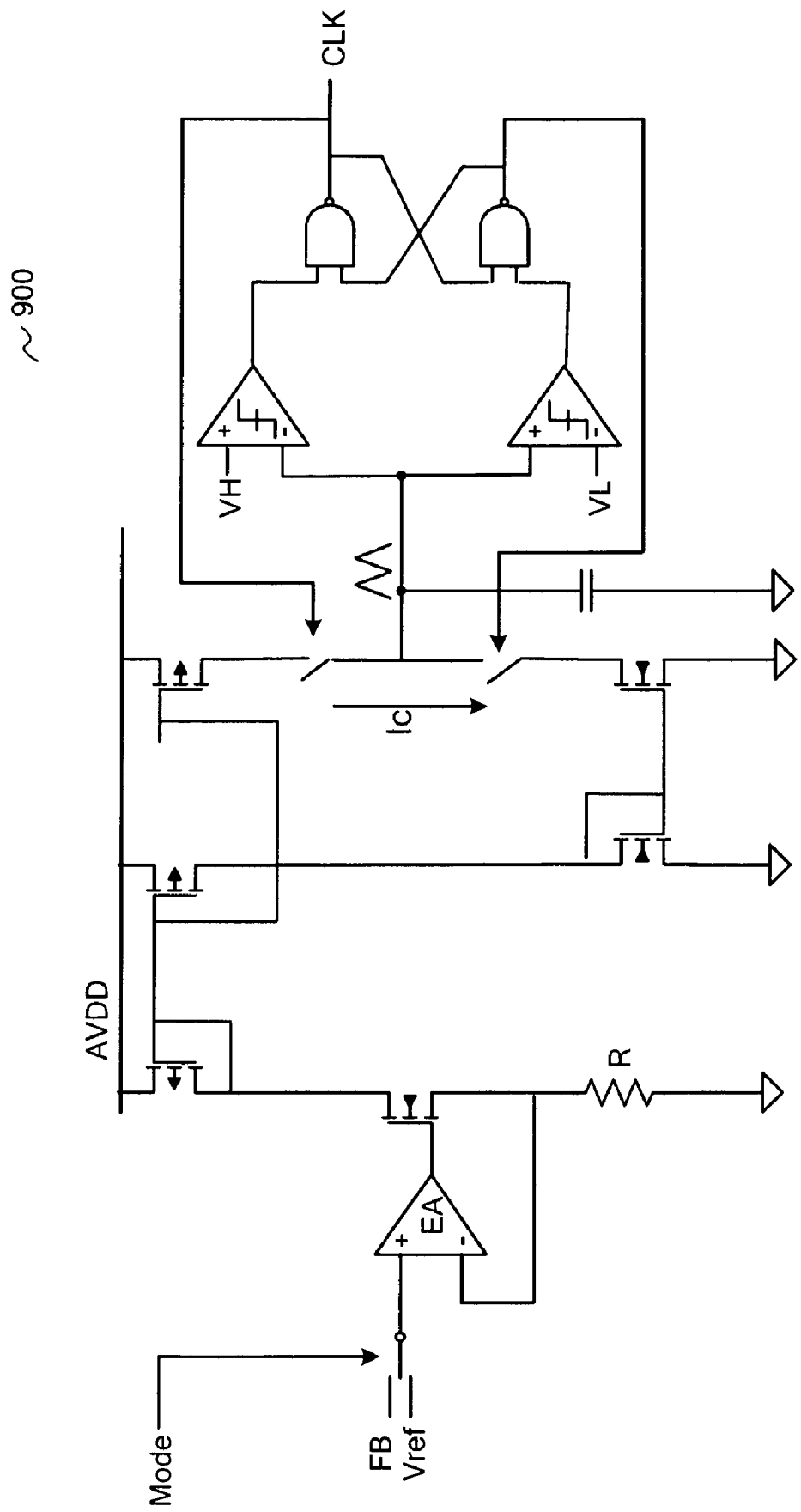
FIG. 9 is a simplified diagram illustrating a circuit for implementing a voltage controlled oscillator according to an embodiment of the present invention.

FIG. 9 is a simplified diagram illustrating a circuit for implementing a voltage controlled oscillator according to an embodiment of the present invention. This diagram is merely an example, which should not unduly limit the scope of the claims. One of ordinary skill in the art would recognize many variations, alternatives, and modifications. As shown in FIG. 9, a voltage controlled oscillator (VCO) 900 is implemented using a number of both analog and logical components. As shown in FIG. 9, the VCO 900 provides an clock output signal based on an operation mode and a feedback reference voltage.

Various components within the box 710 as shown are used to provide constant pulse width. According to various embodiments, each pulse can turn on a power switch (e.g., the switch 415 in system 400) for substantially the same amount of time, thereby allowing constant pulse of power to be delivered. As shown in FIG. 7, the constant pulses are based on the inputs 709, 713, and 711. For example, the pulse width is related the sensed current (i.e., sensed current associated with the load and the feedback condition). Among other things, the constant pulses generated by the components in box 710 allow precise control of amount of power to be delivered to the load. The voltage at FB is converted to the current and then the current is injected to the oscillator to control the oscillation frequency. The generated clock, CLK, is used to trigger the switching-on of the power switch. For example, the switching on time is determined by a PFM comparator.

Figure 10:
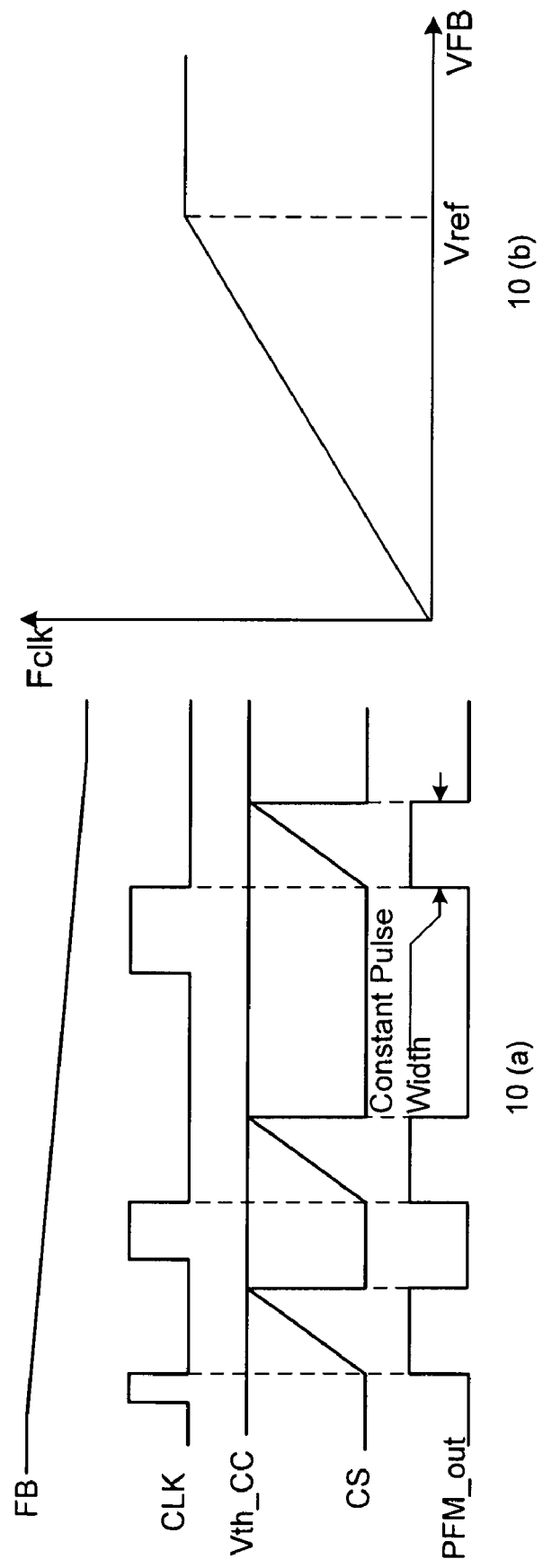
FIG. 10 is a timing diagramming illustrating waveforms generated by a PFM module according to an embodiment of the present invention.

FIG. 10 is a timing diagramming illustrating waveforms generated by a PFM module according to an embodiment of the present invention. This diagram is merely an example, which should not unduly limit the scope of the claims. One of ordinary skill in the art would recognize many variations, alternatives, and modifications. As can be seen in FIG. 10(*a*), the PFM output is characterized by a constant pulse width. The amount of power delivered to the load is controlled by the clock signal, which is in turn based on the feedback voltage. For example, a PFM comparator is applied in which the sensed current signal is compared with a predetermined threshold level. Once the sensed current signal exceeds the threshold level, the output of the comparator changes to turn off the power switch. As a result, the pulse width is based on the predetermined threshold level and the slop of the sensed current signal. For example, since the amount of energy stored in the inductor of primary side winding is associated with the peak current, which is equal to the threshold level, the energy stored in the inductor of the primary side winding is constant for every cycle. The power transferred to the secondary side depends on the switching frequency which is controlled by the feedback voltage.

As shown in FIG. 10(*b*), the clock speed that controls the pulse frequency is in a direct relationship to the feedback voltage (i.e., a function of the load condition). Once the feedback voltage reaches a threshold voltage level (i.e., Vref as shown in FIG. 10), the clock speed for the pulse frequency stays at a predetermined level. For example, once the threshold voltage is reached, the power system (e.g., the power system 400 in FIG. 4) switches to the pulse width modulation mode.

Now referring back to FIG. 4. The control component 401 also includes the UVLO component 416 for providing under-voltage lockout (UVLO), which may cause the system 400 to shut down and reinitiate. Depending on the application, the threshold voltage for triggering the functioning of the UVLO component 416 may be changed.

In summary, the system 400 operates in, depending on the load condition, PWM mode or PFM mode. More specifically, the system 400 operates in PWM mode when load condition is high and operates in PFM mode when the load condition is low. When necessary, the UVLO component 416 is used to provide desirable under-voltage lockout. It is to be understood that there can be variations that are within the scope of the present invention.

Figure 11:
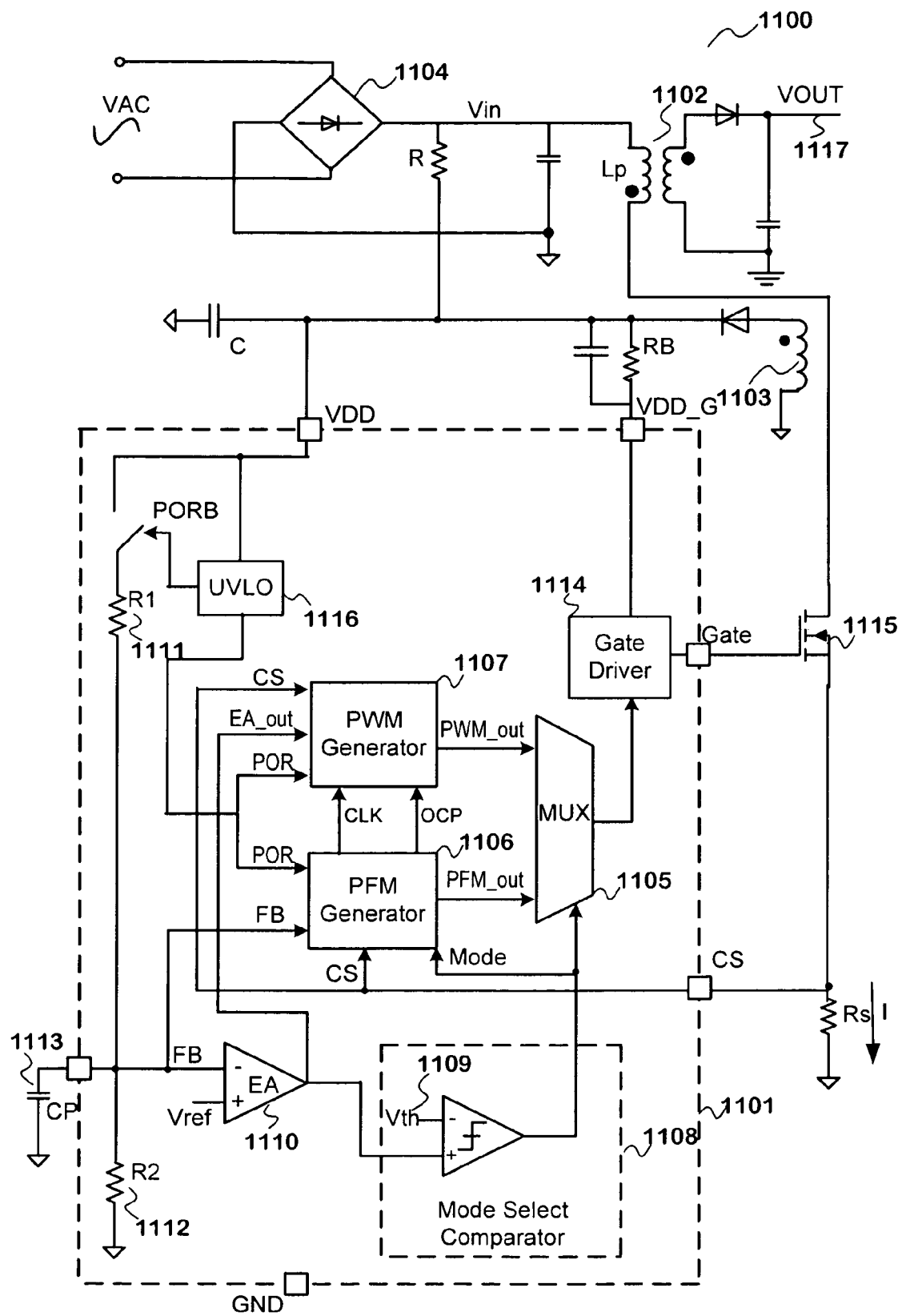
FIG. 11 is a simplified diagram illustrating an alternative embodiment of a power system according to an embodiment of the present invention.

FIG. 11 is a simplified diagram illustrating an alternative embodiment of a power system according to an embodiment of the present invention. This diagram is merely an example, which should not unduly limit the scope of the claims. One of ordinary skill in the art would recognize many variations, alternatives, and modifications.

As shown in FIG. 11, a power system 1100 includes the following components:
1. primary winding 1102;
2. an auxiliary winding 1103;
3. an input voltage 1104;
4. an MUX selector 1105;
5. a PFM component 1106;
6. a PWM component 1107;
7. a mode selector 1108;
8. a threshold voltage 1109;
9. an error amplifier 1110;
10. resistors 1111 and 1112;
11. a capacitor 1113;
12. a switch 1115;
13. an UVLO component 1116;
14. a gate driver 1114; and
15. an output 1117.

During operation, the system 1100 receives power from the input voltage 1104. The system 1100 sets the output power level based on the output load and provides the output 1117. As shown in FIG. 11, the system 1100 includes both the primary winding 1102 and the auxiliary winding 1103. The primary winding 1102 is used to deliver power to the output 1117. The auxiliary winding 1103 is used to obtain a feedback signals for the system 1100 to set the output power level. The system 1100 sets the output level by operating the switch 1115. For example, the switch 1115 is implemented by a power MOSFET. Depending on the specific application, the switch 1115 may be implemented by other types of switching components (e.g., BJT, etc.).

The system 1100 sets the power level through the power control component 1101. According to various embodiments, the system 1100 is capable of operating in both PFM mode and PWM mode. When the system 1100 operates in the PFM mode, the power control component 1101 turns the switch 1115 on and off at various frequencies based on the output load condition. When the system 1100 operates in the PWM mode, the power control component 1101 turns the switch 1115 at different "on" times based on the output load condition. The system 1100 switches between the PFM and PWM mode based on the output load condition. For example, when the output voltage is above a threshold level, the system 1100 operates at the PWM mode. On the other hand, when the output voltage is at or below the threshold level, the system 1100 operates at the PFM mode. For example, the output current remains constant when operating in the PFM mode, as explained above.

The control component 1101 determines the operation mode by sensing the load via the auxiliary winding 1103. As shown in FIG. 11, both power delivery and feedback sensing features are implemented using inductive devices (i.e., inductors). But it is to be understood that other types of electrical devices may be used as well. The auxiliary winding 1103 is coupled with second side winding. As a result, the output voltage can be approximately imaged to the auxiliary winding. In a specific embodiment, the voltage in auxiliary winding is also as the power supply for the control component 1101. The voltage after rectification and attenuated is also fed into an FB pin as the control signal for the control component 1101.

A feedback voltage is obtained by the auxiliary winding 1103 and the capacitor 1113 and the resistors 1112 and 1111. For example, the feedback voltage is associated with the output load condition. According to an embodiment, the feedback voltage is stabilized by the capacitor 1113 and the resistors 1112 and 1111. For example, the capacitor 1113 is used for loop stability as the voltage at FB is nearly a DC voltage which is proportional to the output voltage at output 1117. As merely an example, the divided voltage between the resistors 1112 and 1111 is averaged by the RC filter included a resistive divider and the capacitor 1113, and the divided voltage is proportional to the output voltage.

As shown, the control component 1101 is configured to provide two operation modes: PFM and PWM modes. For example, when an initial output voltage is less than the predetermined voltage level, the power conversion needs to be operated in a Constant Current (CC) Mode. The attenuated feedback signal at FB is fed respectively into the error amplifier (EA) 1110 and the PFM component 1106. When the FB signal is lower than the reference voltage of EA, the output of EA will be pull up to high voltage level, thereby causing the mode selector to output a signal to select the PFM component 1106 for power control. For example, the PFM component 1106 controls the on and off of the switch 1115. At the PFM mode, the feedback voltage at FB is provided to the input of EA 1110. The feedback voltage gradually increases when the output voltage increase (e.g., due to an increase in load condition). When feedback voltage at the node FB is close to the reference voltage for the EA 1110, the output of EA falls a level lower than the predetermined voltage, thereby causing the mode selector 1108 to disable the PFM operation mode and enable the PWM operation mode. At the PWM operation mode, the PWM component 1107 controls the on/off of the switch 1115. In addition, when operating at the PWM mode, the system 1100 is also operating according to a Constant Voltage (CV) Mode.

The control component 1101 also includes the UVLO component 1116 for providing under-voltage lockout (UVLO), which may cause the system 1100 to shut down and reinitiate. Depending on the application, the threshold voltage for triggering the functioning of the UVLO component 1116 may be changed. As an example, the UVLO component 1116 is controlled by a power-on reset signal.

In summary, the system 1100 operates in, depending on the load condition, PWM mode or PFM mode. More specifically, the system 1100 operates in PWM mode when load condition is high and operates in PFM mode when the load condition is low. When necessary, the UVLO component 1116 is used to provide under-voltage lockout. It is to be understood that there can be variations that are within the scope of the present invention.

According to an embodiment, the present invention provides a power system with selectable power modes. The power system includes a first terminal for outputting energy, and the first terminal is electrically coupled to a load. The system also includes a pulse-frequency modulation (PFM) component that is configured to adjust a pulse frequency based on the load. The system additionally includes a pulse-width modulation (PWM) component that is configured to adjust a pulse width based on the load. The system further includes a switch that is electrically coupled to the first terminal. Also, the system includes a control component, the control component being configured to provide a control signal that is capable of causing the switch to be turned on or off. The control signal is associated with an output of the PWM component and the pulse width if an output is greater than a predetermined value. The control signal is associated with an output of the PFM component and the pulse frequency if the output is lower than the predetermined value. For example, the embodiment is illustrated according to FIGS. 4 and 11.

According to an alternative embodiment, the present invention provides a method for supplying power. The method includes receiving a power input from an input source. The method also includes delivering a power output to a load. The method additionally includes measuring a feedback voltage that is associated with an output voltage for the load. The method further includes comparing the feedback voltage to a first threshold voltage. The method also includes delivering power using a pulse-width modulation if the feedback voltage is higher than the first threshold voltage. The method also includes delivering power using a pulse-frequency modulation if the feedback voltage is lower than the first threshold voltage. In addition, the method includes terminating the power output to the load if the feedback voltage is lower than a second threshold voltage. For example, the embodiment is illustrated according to FIG. 4.

According to an alternative embodiment, the present invention provides an apparatus for output power using a pulse frequency modulation. The apparatus includes an input for receiving a feedback signal. The apparatus also includes a pulse generator. The pulse generate is configured to generate pulses at substantially a constant frequency. In addition, the apparatus includes an oscillator configured to provide output signals at a frequency that is associated with the feedback signal. In addition, the method includes a logic component that is configured to provide a control signal based at least on the pulses and the output signals. For example, the embodiment is illustrated according to FIGS. 7-9.

Many benefits are achieved by way of the present invention over conventional techniques. In some embodiments, the method provides an energy efficient and high performance way that provides power to both light and heavy loads. By practicing embodiment of the present invention, the amounted of energy wasted during a power switching process is reduced, and the switching time is reduced as well. Additionally, the method provides a process that is compatible with conventional process technology without substantial modifications to conventional equipment and processes. Depending upon the embodiment, one or more of these benefits may be achieved.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for providing one or more selectable modulation modes, the system comprising:
 a pulse-frequency-modulation (PFM) component configured to adjust a pulse frequency;
 a pulse-width-modulation (PWM) component configured to adjust a pulse width; and
 a selection component coupled to the PFM component, the PWM component, and a switch;
 wherein the selection component is configured to:
  receive a feedback signal related to an output of a power system, the power system including a primary winding;
  process information associated with the received feedback signal;
  select a modulation mode based on at least information associated with the received feedback signal; and
  output a modulation signal in response to at least the selected modulation mode;
 wherein:
  the selected modulation mode is a PWM mode, if the received feedback signal satisfies a first condition, the PWM mode corresponding to the PWM component;

the selected modulation mode is the PFM mode, if the received feedback signal satisfies a second condition, the PFM mode corresponding to the PFM component; the PWM mode and the PFM mode are different; and the first condition and the second condition are different;

wherein the switch is configured to adjust a current flowing through the primary winding based on at least information associated with the outputted modulation signal.

2. The system of claim 1, and further comprising an undervoltage lockout component.

3. The system of claim 1 wherein the PFM component includes a voltage controlled oscillator.

4. The system of claim 1 wherein the selection component includes a MUX selector, a mode selector, and an error amplifier.

5. The system of claim 1 wherein the PFM mode corresponds to a constant current mode associated with the output of the power system.

6. The system of claim 1 wherein the PWM mode corresponds to a constant voltage mode associated with the output of the power system.

7. A method for providing one or more selectable modulation modes, the method comprising:

receiving a feedback signal related to an output of a power system, the power system including a primary winding;

processing information associated with the received feedback signal;

determining whether the received feedback signal satisfies a first condition or a second condition;

if the received feedback signal is determined to satisfy the first condition, selecting a pulse-width-modulation (PWM) mode as a selected modulation mode;

if the received feedback signal is determined to satisfy the second condition, selecting a pulse-frequency-modulation (PFM) mode as the selected modulation mode; and generating a modulation signal in response to at least the selected modulation mode, the modulation signal being associated with information for adjusting a current flowing through the primary winding;

wherein:

the first condition and the second condition are different;

the PFM mode is associated with adjusting a pulse frequency;

the PWM mode is associated with adjusting a pulse width; and the PWM mode and the PFM mode are different.

8. The method of claim 7 wherein the PFM mode corresponds to a constant current mode associated with the output of the power system.

9. The method of claim 7 wherein the PWM mode corresponds to a constant voltage mode associated with the output of the power system.

* * * * *